US006553328B1

United States Patent
Gold

(10) Patent No.: US 6,553,328 B1
(45) Date of Patent: Apr. 22, 2003

(54) NON-INTRUSIVE MEMORY ACCESS FOR EMBEDDED PROCESSORS

(75) Inventor: Jeffrey J. Gold, Rancho Palos Verdes, CA (US)

(73) Assignee: Hughes Electronics Corp., El Segundo, CA (US)

( * ) Notice: Subject to any disclaimer, the term of this patent is extended or adjusted under 35 U.S.C. 154(b) by 0 days.

(21) Appl. No.: 09/507,378

(22) Filed: Feb. 18, 2000

(51) Int. Cl.⁷ .......................... G06F 19/00; G01D 3/00
(52) U.S. Cl. ........................................................ 702/108
(58) Field of Search ................................. 702/117, 108; 703/13, 14, 21, 22, 23, 25, 28; 365/189.09, 230.01, 230.05

(56) References Cited

U.S. PATENT DOCUMENTS

| | | | | | |
|---|---|---|---|---|---|
| 4,920,481 A | * | 4/1990 | Binkley et al. | ................ | 703/26 |
| 4,958,273 A | * | 9/1990 | Anderson et al. | ............. | 712/29 |
| 5,655,111 A | * | 8/1997 | Uegaki | ......................... | 703/28 |
| 5,669,009 A | * | 9/1997 | Buktenica et al. | ............ | 712/35 |
| 5,808,921 A | * | 9/1998 | Gold et al. | ................ | 702/108 |
| 5,813,043 A | * | 9/1998 | Iles et al. | ................... | 711/163 |
| 6,041,406 A | * | 3/2000 | Mann | .......................... | 712/227 |
| 6,052,312 A | * | 4/2000 | Ishii | ....................... | 365/189.04 |
| 6,141,726 A | * | 10/2000 | Dell | ........................... | 711/103 |
| 6,233,193 B1 | * | 5/2001 | Holland et al. | ............. | 365/222 |
| 6,233,673 B1 | * | 5/2001 | Higashida | ................... | 712/227 |
| 6,339,753 B1 | * | 1/2002 | Nagatome | .................... | 703/28 |

* cited by examiner

Primary Examiner—John Barlow
Assistant Examiner—Demetrius Pretlow
(74) Attorney, Agent, or Firm—Terje Gudmestad

(57) ABSTRACT

A system for testing an embedded processor, such as an embedded processor for a spacecraft. The system comprises an Emulated Spacecraft Control Processor (ESCP) which contains the embedded processor, a simulation engine, and a host computer. The emulated spacecraft control processor includes a dual-port memory for emulating the memory for the embedded processor and data transfer logic which monitors cycles of the embedded processor to arbitrate access to the dual-port memory, the data transfer logic is operative to allow an access to the dual-port memory when the embedded processor performs an I/O cycle, wherein the access is performed before a subsequent machine cycle of the embedded processor.

19 Claims, 1 Drawing Sheet

NON-INTRUSIVE MEMORY ACCESS FOR EMBEDDED PROCESSORS

TECHNICAL FIELD

The present invention relates generally to spacecraft simulation, and more particularly to systems for non-intrusive memory transfers for embedded processor-based systems.

BACKGROUND ART

The increasing size and complexity of various spacecraft and control subsystems therefore have created a need for detailed validation and verification before deployment. Examples of spacecraft subsystems requiring validation and verification include: (i) multiprocessor-based systems which can have complex software architectures; (ii) fault detection and response systems providing extended autonomous operations; (iii) multiple-articulated payloads and multibody control; (iv) precision payload pointing systems with multiple interacting elements; and (v) sophisticated ground software for automated spacecraft operations.

However, system-level ground testing to verify full system performance of a spacecraft can be costly and/or inadequate. Present implementations of hardware-in-the-loop systems to provide ground testing require special purpose interface hardware and harnessing to create a test environment whereby system hardware or emulations thereof can be integrated with high-fidelity, non-linear, real-time simulations and then instrumented to facilitate verification and validation testing.

Embedded processors and software that constitute various spacecraft subsystems implement asynchronous, real-time processes that require non-intrusive instrumentation to facilitate adequate testing. It is imperative that the real-time behavior of the systems under test not be compromised by instrumentation. Otherwise, the system under test is not truly the system to be used operationally.

Known implementations of such systems required a substantial amount of harnessing and interfacing devices to accommodate non-intrusive instrumentation; typically embedded processor memory monitoring and control. The amount of harnessing and interfacing devices reduces the overall reliability of the system and increases the cost. Known systems employ bus monitoring schemes to facilitate memory monitoring. More capable mechanisms may allow for memory modification. However, these do not operate on a real time basis. That is, the previous implementations have resident arbitration schemes that control access to the data buses. These arbitration schemes initiate wait states that are not found in actual running. Thus, known systems employ complex mechanisms to monitor the contents of embedded processor memories and implement intrusive mechanisms to modify memory.

U.S. Pat. No. 5,808,921 is commonly assigned and was co-invented by the inventor of the present invention. In the '921 patent, a system for selected and limited, non-intrusive (input/output) I/O access was provided when the CPU was in a memory cycle. The dual port memory mimicked the I/O buffer. Thus, when the '921 system was in a memory cycle, it was not using the I/O and thus data was transferred via the I/O. Thus, the dual port memory emulated the I/O space. The U.S. Pat. No. 5,808,921 has limited functionality because only the I/O space is emulated and only a portion thereof. U.S. Pat. No. 5,808,921 is hereby incorporated by reference.

It would therefore be desirable to increase the functionality of a simulator and to provide a method and apparatus for providing non-intrusive memory access without extraneous wait states so that crucial instrumentation, in the form of memory status and control, on the embedded, real-time application, can be performed in support of overall system verification and validation.

SUMMARY OF THE INVENTION

It is an object of the present invention to provide a low-cost, reliable system for verifying an embedded processor-based system which emulates the entire memory and which requires less facility resources (e.g. test equipment) in comparison to previously-implemented hardware-in-the-loop systems.

A further object of the present invention is to provide a system for testing an embedded processor-based system which does not require special purpose interface hardware and harnessing to integrate the embedded processor-based system with instrumentation to monitor the contents of embedded memories.

In carrying out the above objects, the present invention provides a system for testing an embedded processor, such as an embedded processor for a spacecraft. The system comprises an Emulated Spacecraft Control Processor (ESCP) which contains the embedded processor, a simulation engine, and a host computer. The emulated spacecraft control processor includes a dual-port memory for emulating the input/output interface for the embedded processor and data transfer logic which monitors cycles of the embedded processor to arbitrate access to the dual-port memory, the data transfer logic is operative to allow an access to the dual-port memory when the embedded processor performs a I/O cycle, wherein the access is performed before a subsequent memory cycle of the embedded processor.

In a preferred embodiment, the simulation engine executes program steps asynchronously with respect to the embedded processor. Here, the Emulated Spacecraft Control Processor includes an overlayed dual-port memory for emulating the memory for the embedded processor and data transfer logic which monitors cycles of the embedded processor to arbitrate access to the dual-port memory. The data transfer logic is operative to allow simulation engine access to the dual-port memory when the embedded processor performs an I/O cycle, wherein the access is performed before a subsequent machine cycle of the embedded processor. The data transfer logic is operative to inhibit access by the simulation engine to the dual-port memory when a memory cycle is performed by the embedded processor.

Also in a preferred embodiment, the simulated sensor data, the command data, the actuator command data, and the telemetry data are communicated via an industry standard bus. Here, the system further comprises an interactive bus manager which communicates the command data and the telemetry data between the bus and the host computer. Additionally, the simulated sensor data and actuator command data are communicated between the simulation engine and the Emulated Spacecraft Control Processor using the industry standard bus.

Further in carrying out the above objects, the present invention provides a method of testing an embedded processor based upon the above-described steps.

Embodiments of the present invention are advantageous in that the simulation engine and the Emulated Spacecraft Control Processor share memory space without any compromise of the real-time performance of the embedded processor.

These and other features, aspects, and embodiments of the present invention will become better understood with regard

BEST MODE FOR CARRYING OUT THE INVENTION

Figure 1:
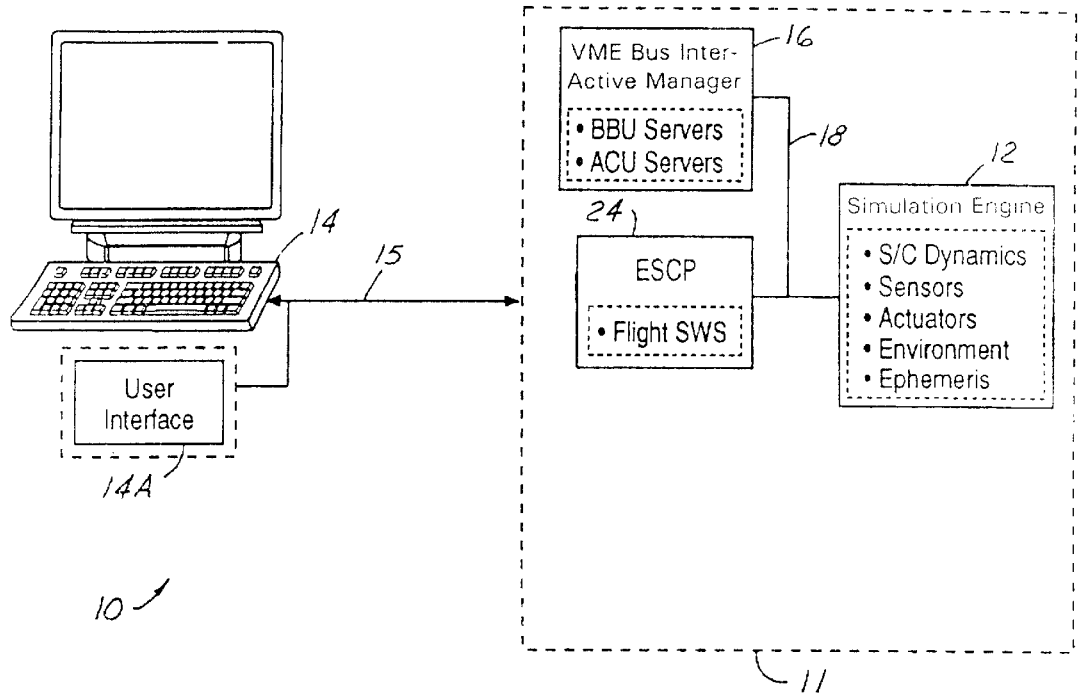
FIG. 1 is a block diagram of an embodiment of a real-time spacecraft simulation system in accordance with the present invention.

FIG. 1 is a block diagram of a real-time spacecraft simulation system 10 in accordance with the present invention. The real-time spacecraft simulation system 10 can be embodied by an Applied Dynamics Real Time Station (AD RTS) 11 manufactured by Applied Dynamics. The AD RTS 11 system is a stand-alone VMEbus-based real-time simulation and analysis system which uses a mixture of 9U.times.400 mm ADI processor and input/output cards. Physically, the AD RTS system can be contained in a mini-tower housing.

The real-time spacecraft simulation system 10 includes one or more simulation engine (SE) 12, which is used to simulate system dynamics in real time. For an AD RTS system 11, the simulation engine 12 is in the form of processor cards installed therein.

Each simulation engine 12 is a processor that solves the dynamic model equations of motion in real-time. One or more simulation engines can be installed in the real-time spacecraft simulation system as problem size and complexity increase throughput requirements. For example, simulation engine 12 may be used to model the attitude control subsystem (ACS) of the spacecraft. The ACS simulation engine 12 models dynamics, sensors and actuators both environmental and orbital In a constructed embodiment, the simulation engine 12, was implemented in a MVME2604 SBC operating at 330 MHz.

A host computer 14 with an interface 14A is utilized for simulation development, cross-compiling, interfacing to a user, and displaying output information. The host computer 14 can be embodied by a computer workstation such as ones available from Sun, Hewlett-Packard, or VAX, for example. The host computer 14 runs simulation system software having interactive commands which provide simulation control. The simulation system software can be embodied by ADI Simsystem software. The host computer 14 also utilizes a real-time plotting software package to provide strip chart and x-y plot capabilities. Such a real-time plotting package can be embodied by the Simplot software package. Interface 14A provides the proper protocol to communicate with AD RTS 11.

The host computer 14 through interface 14A communicates with a VMEbus interactive manager (VIM) 16 through an Ethernet line or other communication line 15. The VIM 16 is operative to initialize the real-time spacecraft simulation system 10, download application software to the embedded processors in the real-time spacecraft simulation system 10, and monitor simulation variables in real time. An additional feature of the VIM 16 is to provide bi-directional data transfer between the processors in the real-time spacecraft simulation system 10 and the host computer 14 via a VMEbus 18 in a constructed embodiment, VIM 16 was constructed of a Motorola MVME2604 SBC with a TCP/IP protocol.

The AD RTS system 11 has an Emulated Spacecraft Control Processor (ESCP) 24 which is a VMEbus-compatible card that emulates a Spacecraft Control Processor (SCP). The ESCP 24 includes a microprocessor along with supporting circuitry to execute flight software. The ESCP 24 and the simulation engine 12 are accessed to perform data transfers, and to provide/receive data to/from the VIM 16 for real-time data logging and user control. A plurality of ESCPs can be included to reflect the redundancy of operational systems.

The VMEbus 18 is utilized for all command, telemetry, sensor, and actuator interfacing. Actuator data is communicated from the ESCP 24 to the simulation engines 12 via the VMEbus 18. Sensor data is communicated from the simulation engine 12 to the ESCP 24 via the VMEbus 18. Telemetry data is communicated from the ESCP 24 to the host computer 14 via the VIM 16 and the VMEbus 18. Command data is communicated from the host computer 14 to the ESCP 24 via the VMEbus 18 and the VIM 16.

Alternative embodiments of the ESCP 24 include circuitry to support interfaces that cannot be implemented with the VMEbus 18, such as a very fast interface or an analog interface.

Figure 2:
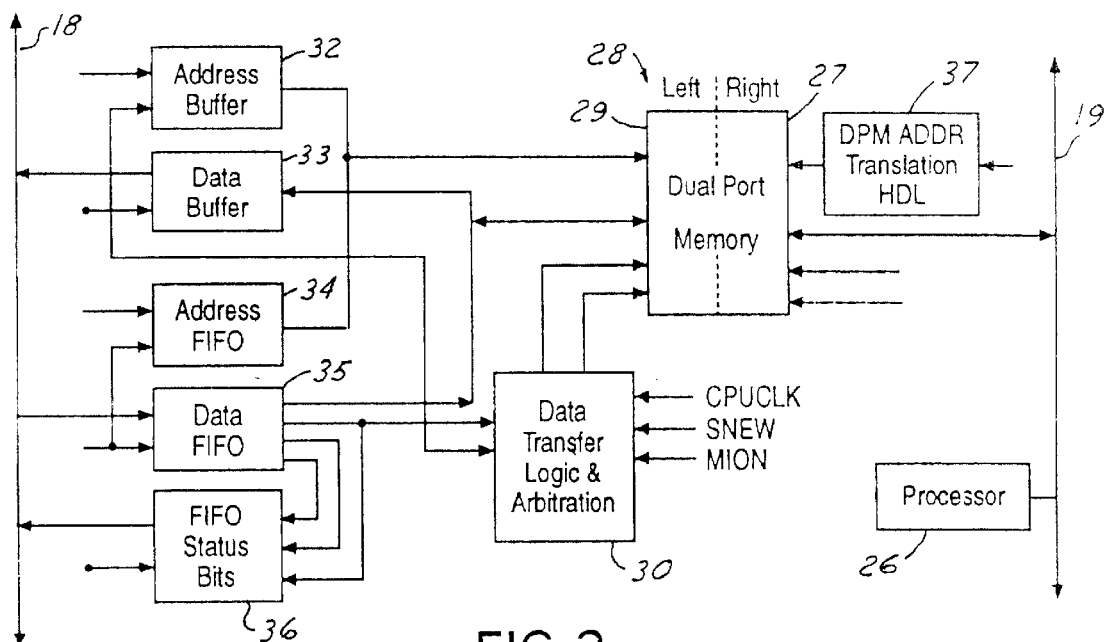
FIG. 2 is a block diagram of a partial embodiment of an Emulated Spacecraft Control Processor in accordance with the present invention.

FIG. 2 is a block diagram of a partial embodiment of the ESCP 24 in accordance with the present invention. The ESCP 24 includes a processor 26 such as a GP31750 microprocessor unit. The processor 26 communicates with the right-hand side (RHS) 27 of a dual-port memory 28 via processor bus 19. The VMEbus 18 communicates with the left-hand side (LHS) 29 of the dual-port memory 28. The dual-port memory 28 emulates the memory space of the processor 26.

Data transfer and arbitration logic 30 is coupled to dual port memory and is used when loading and reading from the dual-port memory 28 to prevent contentions in the event that the same location is being accessed from both sides simultaneously.

The use of a busy signal, which is provided to a losing side of an arbitration, is avoided in the dual-port memory 28 so that the flight software can execute in real-time on the ESCP 24. To avoid this possibility, an address buffer 32, a data buffer 33, an address FIFO 34 and a data FIFO 35 and data transfer logic with arbitration are utilized. The Address buffer 32 and address FIFO are coupled to left-hand side 29 of dual port memory 28. Data buffer 33 and data FIFO 35 are also coupled to dual port memory and to VMEbus 18.

The data transfer and arbitration logic 30 monitors the cycles of the processor 26 and generates read and write signals that are coupled to dual port memory 28. If an I/O cycle is performed, the logic allows one access to the dual-port memory 28 from the LHS 29, then waits for the next cycle. The dual-port memory access is completed before the next machine cycle. If a memory cycle is performed, the logic waits for an indication of the next machine cycle.

For a write operation to the LHS of the dual-port memory 28, the dual-port memory address and data are loaded into respective address FIFO 34 and Data FIFO 35. The transfer logic monitors a FIFO empty flag of FIFO status bits 36 to determine the existence of data to transfer. When there is no data to transfer, the logic then waits for the next machine cycle.

For a read operation from the LHS 29 of the dual-port memory 28, the simulation reads FIFO status bits 36 to insure that there is no data in the address FIFO 34 or data FIFO 35 that is waiting to be loaded into the dual-port memory 28. A read is initiated upon a FIFO empty flag (EF) indicating an empty transfer FIFO. Once a read is initiated, the read arbitration logic determines the next machine cycle. The read arbitration holds the VMEbus data transfer acknowledge until the dual-port memory 28 can be safely read.

For read and write operations, from and to, the RHS of the dual-port memory 28, the processor performs nominal memory access operations via processor bus 19. A dual-port memory address translator 37 is used to provide the appropriate memory address within dual-port memory 28.

The present invention improves the performance of the simulation system by decreasing the time required to capture or restore the embedded random access memory for the purpose of saving and restoring the system. This system is therefore more attractive as a deliverable to existing and potential customers who wish to have an on-site simulator. The improved performance will also add to the efficiency of company test teams.

The present invention improves the capability of the simulation system by allowing for non-intrusive memory access for the purpose introducing faults scenarios into the system. This system is therefore more attractive as a deliverable to existing and potential customers who wish to have an on-site simulator.

The present invention reduces the complexity and cost of the simulation by eliminating instrumentation and interface hardware. Furthermore, additional slots within the mini-tower housing are made available for additional simulation, emulation or instrumentation capabilities.

While the best mode for carrying out the invention has been described in detail, those familiar with the art to which this invention relates will recognize various alternative designs and embodiments for practicing the invention as defined by the following claims.

What is claimed is:

1. A system for testing an embedded processor, the system comprising:
    an emulated spacecraft control processor which contains the embedded processor, said emulated spacecraft control processor includes a dual-port memory for emulating the memory for the embedded processor and data transfer logic which monitors cycles of the embedded processor to arbitrate access to the dual-port memory, the data transfer logic is operative to allow an access to the dual-port memory when the embedded processor performs an I/O cycle, wherein the access is performed before a subsequent machine cycle of the embedded processor;
    a simulation engine which processes command data from the emulated spacecraft control processor to simulate system dynamics of the spacecraft in real-time, the simulation engine operative to produce the simulated sensor data for input to the emulated spacecraft control processor based on the simulated system dynamics; and
    a host computer which provides the command data and receives the telemetry data from the emulated spacecraft control processor.

2. The system of claim 1 wherein the command data, and the telemetry data are communicated via a VMEbus.

3. The system of claim 2 further comprising a VMEbus interact manager which communicates the command data and the telemetry data between the VMEbus and the host computer.

4. The system of claim 1 wherein the simulation engine and the emulated spacecraft control processor are housed in a single housing.

5. The system of claim 1 wherein the data transfer logic is operative to inhibit access to the dual-port memory when a memory cycle is performed by the embedded processor.

6. The system of claim 1 wherein the simulation engine executes program steps asynchronously with respect to the embedded processor.

7. The system of claim 1 wherein the emulated spacecraft control processor comprises an address buffer, a data buffer, an address FIFO and a data FIFO each coupled to a dual port memory.

8. A method of testing an embedded processor, the method comprising the steps of:
    providing an emulated spacecraft control processor comprising a dual-port memory, which emulates a memory for the embedded processor;
    receiving simulated sensor data and command data for the embedded processor using the emulated spacecraft control processor;
    monitoring cycles of the embedded processor to arbitrate access to the dual-port memory;
    allowing an access to the dual-port memory when the embedded processor performs an I/O cycle, wherein the access is performed before a subsequent machine cycle of the embedded processor.

9. The method of claim 8 further comprising the step of communicating the telemetry data to a host computer.

10. The method of claim 8 further comprising the step of communicating the actuator command data to a simulation engine.

11. The method of claim 8 further comprising the step of processing the command data, using the simulation engine, to simulate system dynamics of the spacecraft in real-time and thereby produce subsequent simulated sensor data for input to the emulated spacecraft control processor.

12. The method of claim 8 wherein the simulated sensor data, the command data, the actuator command data, and the telemetry data are communicated via a VMEbus.

13. The method of claim 8 wherein the simulation engine and the emulated spacecraft control processor are housed in a single housing.

14. The method of claim 8 further comprising the step of inhibiting access to the dual-port memory when a memory cycle is performed by the embedded processor.

15. An emulated spacecraft control processor comprising:
    a VMEbus interface;
    a processor bus;
    processor coupled to said processor bus;
    an embedded processor having an associated memory that is emulated by a dual-port memory of the spacecraft control processor; and
    data transfer logic which monitors cycles of the embedded processor to arbitrate access to the dual-port memory, the data transfer logic is operative to allow an access to the dual-port memory when the embedded processor performs an I/O cycle, wherein the access is performed before a subsequent machine cycle of the embedded processor.

16. An emulated spacecraft control processor as recited in claim 15 further comprising an address FIFO and a data FIFO coupled to said dual port memory.

17. An emulated spacecraft control processor as recited in claim 15 further comprising an address buffer and a data buffer.

18. An emulated spacecraft control processor as recited in claim 15 wherein the data transfer logic is operative to inhibit access to the dual-port memory when a memory cycle is performed by the embedded processor.

19. An emulated spacecraft control processor as recited in claim 15 wherein the simulation engine executes program steps asynchronously with respect to the embedded processor.

* * * * *

UNITED STATES PATENT AND TRADEMARK OFFICE
CERTIFICATE OF CORRECTION

PATENT NO. : 6,553,328 B1
DATED : April 22, 2003
INVENTOR(S) : Jeffrey J. Gold

It is certified that error appears in the above-identified patent and that said Letters Patent is hereby corrected as shown below:

<u>Column 6,</u>
Line 39, should read as follows:
15. An emulated spacecraft control processor comprising: a VMEbus interface; a processor bus; an embedded processor having an associated memory that is emulated by a dual-port memory of the spacecraft control processor coupled to said processor bus; and data transfer logic which monitors cycles of the embedded processor to arbitrate access to the dual-port memory, the data transfer logic is operative to allow an access to the dual-port memory when the embedded processor performs an I/O cycle, wherin the access is performed before a subsequent machine cyle of the embedded processor.

Signed and Sealed this

Twenty-ninth Day of June, 2004

JON W. DUDAS
*Acting Director of the United States Patent and Trademark Office*